(12) United States Patent
Chiu

(10) Patent No.: US 7,464,784 B2
(45) Date of Patent: Dec. 16, 2008

(54) RAPID ASSEMBLY STRUCTURE FOR SCOOTER BODY OF ELECTRIC SCOOTER

(75) Inventor: Chien-Liang Chiu, Hsinchu (TW)

(73) Assignee: Wu's Tech Co., Ltd., Hsinchu (TW)

( * ) Notice: Subject to any disclaimer, the term of this patent is extended or adjusted under 35 U.S.C. 154(b) by 449 days.

(21) Appl. No.: 11/285,027

(22) Filed: Nov. 23, 2005

(65) Prior Publication Data

US 2007/0114087 A1     May 24, 2007

(51) Int. Cl.
*B62D 61/06* (2006.01)
(52) U.S. Cl. ..................... 180/208
(58) Field of Classification Search .......... 180/208, 180/907
See application file for complete search history.

(56) References Cited

U.S. PATENT DOCUMENTS

| | | | | |
|---|---|---|---|---|
| 4,944,359 A * | 7/1990 | Doman et al. | ............... | 180/208 |
| 5,036,938 A * | 8/1991 | Blount et al. | ............... | 180/208 |
| 5,150,762 A * | 9/1992 | Stegeman et al. | ........... | 180/208 |
| 6,336,517 B1 * | 1/2002 | Cheng | ........................ | 180/208 |
| 6,530,446 B1 * | 3/2003 | Lin | ............................. | 180/208 |
| 7,007,975 B2 * | 3/2006 | Taylor et al. | ................ | 280/781 |
| 7,028,799 B2 * | 4/2006 | Lin | ............................. | 180/208 |

* cited by examiner

*Primary Examiner*—Paul N Dickson
*Assistant Examiner*—Nicole Verley

(57) ABSTRACT

A rapid assembly structure for the scooter body of an electric scooter improves and modifies on some current devices of the scooter body to achieve a stable and rapid assembly structure, and thus facilitate to carry and store up the electric scooter. The assembly structure includes a front body and a rear body. A fastening means is provided between the front body and a rear body for fixing the front body and the rear body. A locking device is provided on the front body for enhancing the fixing effect between the front body and the rear body.

5 Claims, 5 Drawing Sheets

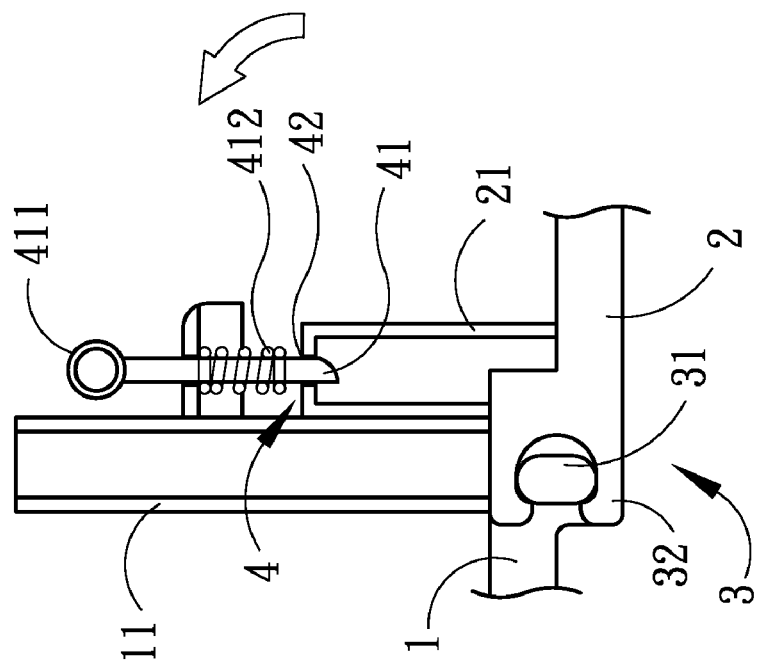
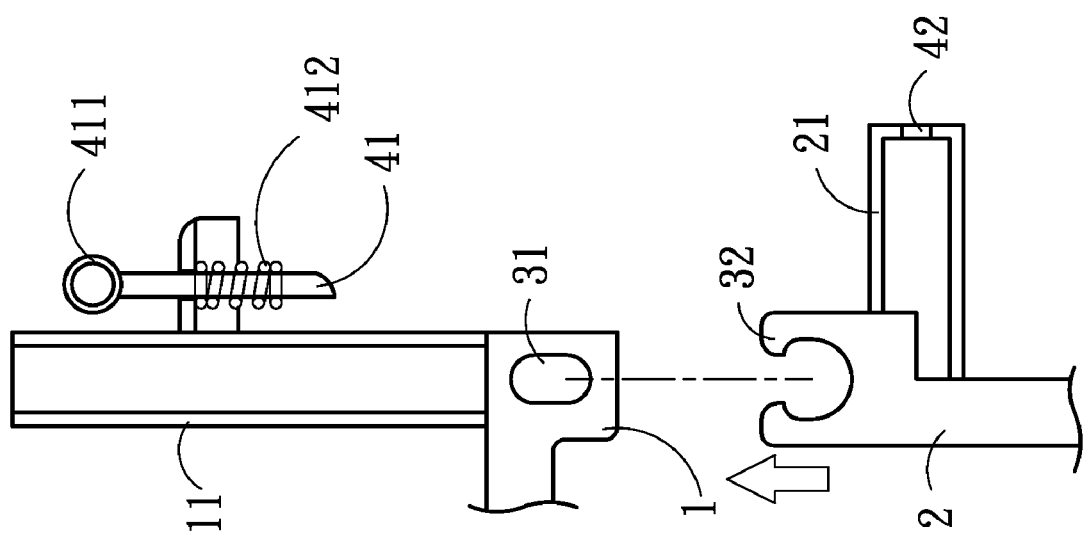
FIG. 6
FIG. 7

RAPID ASSEMBLY STRUCTURE FOR SCOOTER BODY OF ELECTRIC SCOOTER

BACKGROUND OF THE INVENTION

The present invention relates to a rapid assembly structure for the scooter body of an electric scooter. In particular, the present invention relates to a rapid assembly structure for the scooter body of an electric scooter with low cost, high performance and stable structure.

Since electric scooters are compact in structure and easy for operation, they are very suitable for short-distance transportation. Also, electric scooters are electric-powered without any fuels, thus they create no air pollution and low noise. Such features conform to the requirements for environment conservation. Therefore, electric scooters have become a means of short-distance transportation for modern people. Especially, since the operation of an electric scooter is easy and labor-saving, it is very suitable for women to buy daily stuffs and for elders or handicapped people to go to their intended place.

Although electric scooters have the above advantages, the volume and weight of each electric scooter is a little bulky and thus it is inconvenient to carry and store up. Especially, when a breakdown of the electric scooter happens, since the user of the electric scooter generally has low strength, he/she can do nothing but only wait for road rescue, resulting in waste of time, traffic obstruction and even waste of money for subsequent towing and repair.

Therefore, it is necessary for the scooter body of an electric scooter to have a device for easy disassembly and replacement, by which the scooter body can be easily disassembled by the user or other people to directly repair the damaged portions. In addition, such device helps to carry or store up the electric scooter. However, existing methods for assembling an electric scooter generally utilize screws or rivets, such assembling methods cannot fulfill the above demands.

In view of the above, the inventor of the present invention has proposed a novel structure of the electric scooter, which is easy in assembly, reduced in space and helpful to carry or store up.

SUMMARY OF THE INVENTION

The present invention is to provide a rapid assembly structure for the scooter body of an electric scooter so as to stably and rapidly assemble the scooter body.

The present invention is to provide a rapid assembly structure for scooter body of an electric scooter. After being disassembled, the scooter body can be easily carried or stored up without occupying too much space.

According to the present invention, the rapid assembly structure for the scooter body of an electric scooter comprises a front body and a rear body. A fastening means is provided between the front body and the rear body, and the fastening means is provided with a positioning pin and a positioning hook between the front body and the rear body such that the fastening means can fix the front body and the rear body. The front body is provided with an accommodating rod for accommodating a seat frame. The rear body is provided with a connecting pillar corresponding to the position of the accommodating rod. A locking device is provided between the accommodating rod and the connecting pillar. The locking device includes a locking hook and locking notch. The locking hook is pivotably provided on the accommodating rod of the front body with a shaft center. A spring is put on the shaft center. The locking notch is provided on the connecting pillar of the rear body. The bottom of the locking hook is provided with a hook body. With inserting the seat frame into the accommodating rod and pushing out the positioning hook, the hook body of the locking hook hooks on the locking notch so as to enhance the fixing effect between the front body and the rear body.

BRIEF DESCRIPTION OF THE DRAWINGS

The drawings disclose an illustrative embodiment of the present invention which serve to exemplify the various advantages and objects hereof, and are as follows:

FIG. 6 is a first exemplary view showing how the locking device of the present invention is used.

FIG. 7 is a second exemplary view showing how the locking device of the present invention is used.

DETAILED DESCRIPTION OF THE PREFERRED EMBODIMENT

Figure 1:
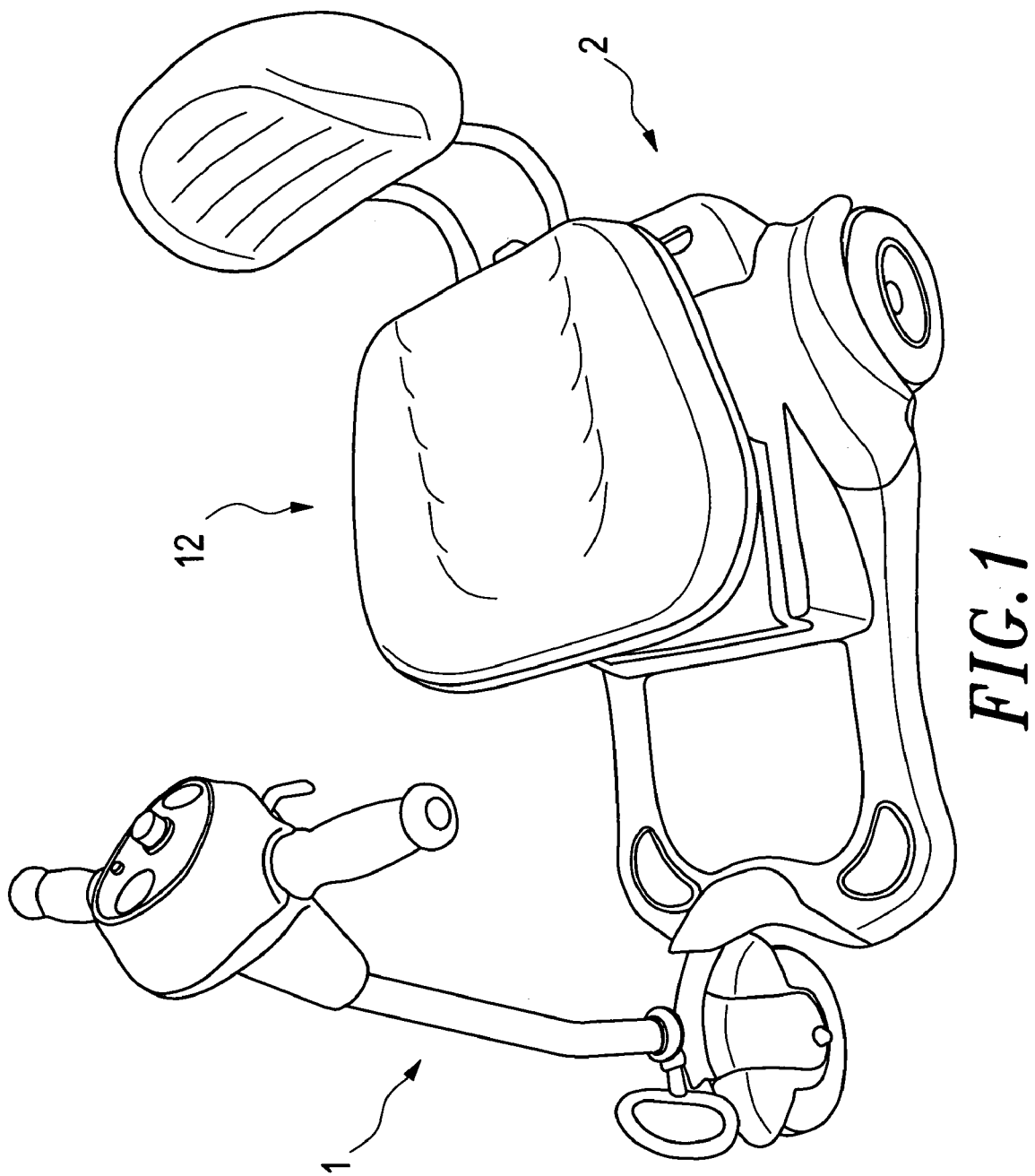
FIG. 1 is a perspective view of the present invention.
Figure 2:
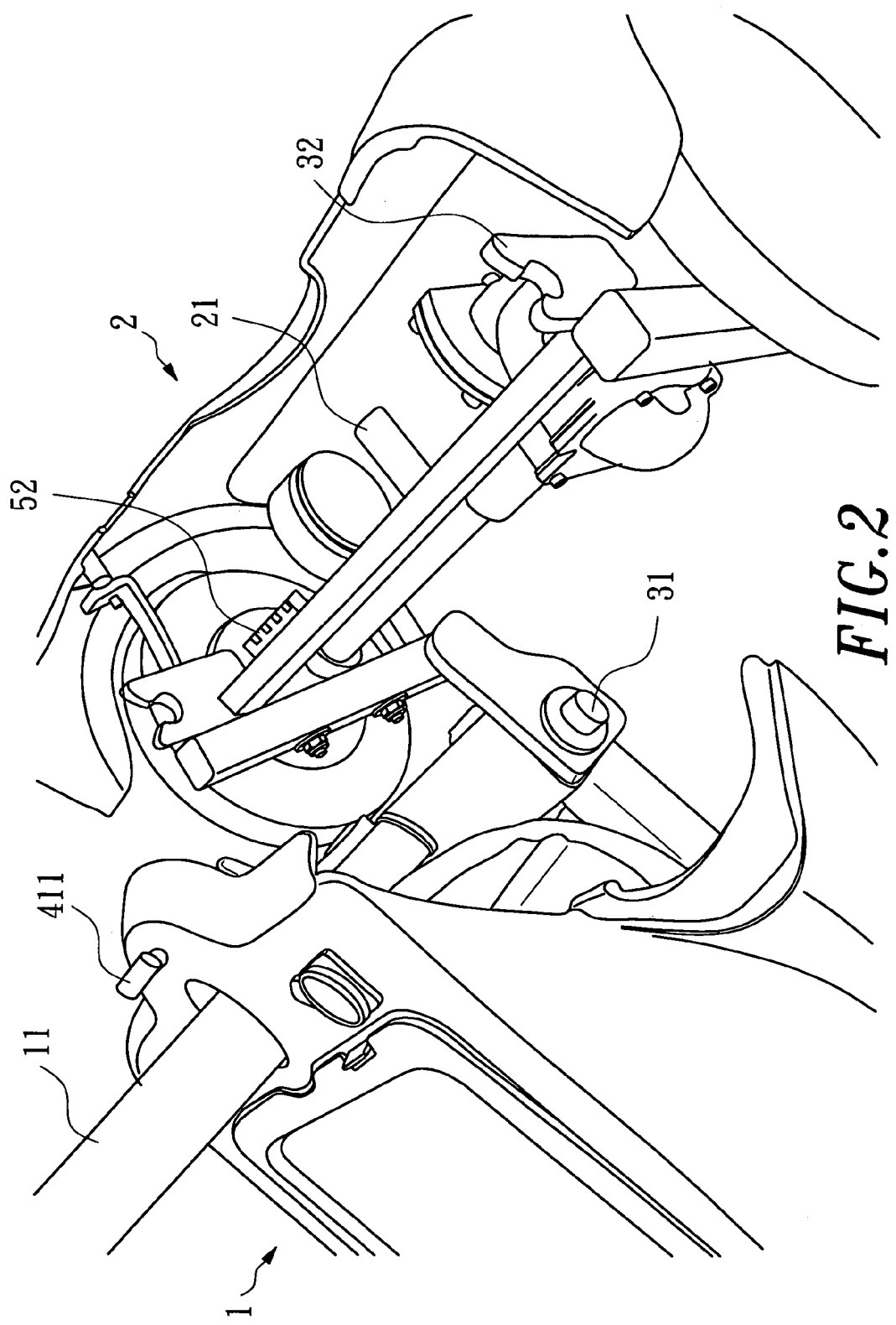
FIG. 2 is a first exemplary view showing the action of the fastening means of the present invention.
Figure 3:
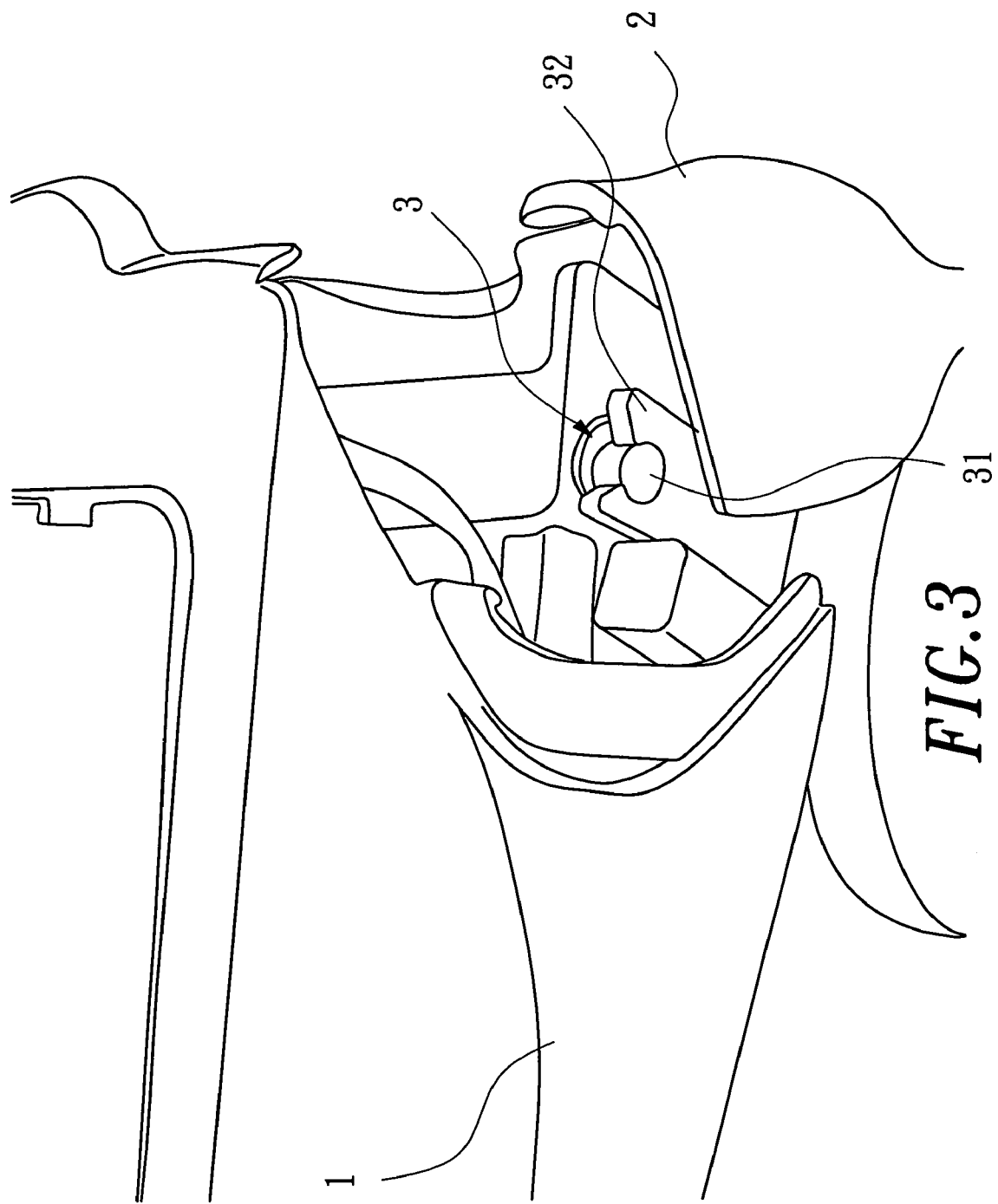
FIG. 3 is a second exemplary view showing the action of the fastening means of the present invention.

With reference to FIGS. 1 to 3, the present invention relates to a rapid assembly structure for the scooter body of an electric scooter. The electric scooter comprises a front body 1 and a rear body 2. The front body 1 has an accommodating rod 11 for accommodating a seat 12. The rear body 2 is provided with a positioning pillar 21 corresponding to the accommodating rod 11.

The present invention provides a fastening means 3 between the front body 1 and the rear body 2. The fastening means 3 is provided with a connecting pillar 31 on the front body 1, and the rear body 2 is provided with a positioning hook 32. The connecting pillar 31 has an oval shape. The opening of the positioning hook 32 is slightly smaller than the diameter of the long shaft of the connecting pillar 31. When assembling, the rear body 2 is slightly turned to perpendicular to the front body 1 such that the opening of the positioning hook 32 can be hooked on the short shaft of the connecting pillar 31. Then, after the rear body 2 returns the initial state, the front body 1 can be fixed to the rear body 2. At this time, since the opening of the positioning hook 32 is parallel to the long shaft of the connecting pillar 31, the connecting pillar 31 can be firmly secured to the positioning hook 32 without any accidental detachment. As a result, the integrity and the safety of the scooter body can be well maintained.

Figure 4:
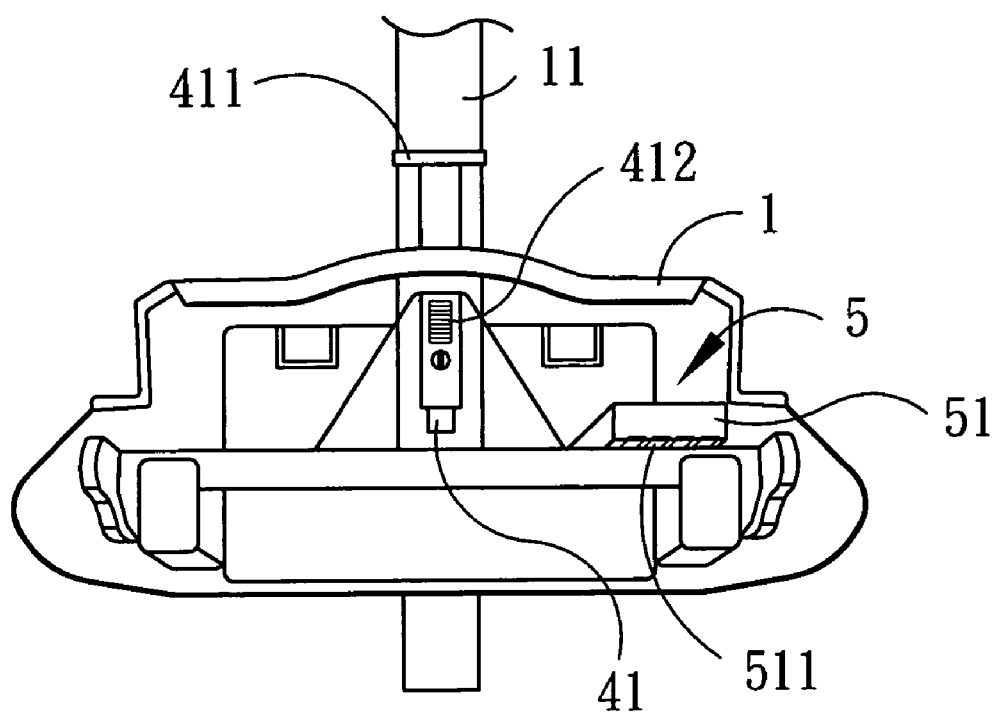
FIG. 4 is a view showing the detailed structure of the front body of the electric scooter of the present invention.
Figure 5:
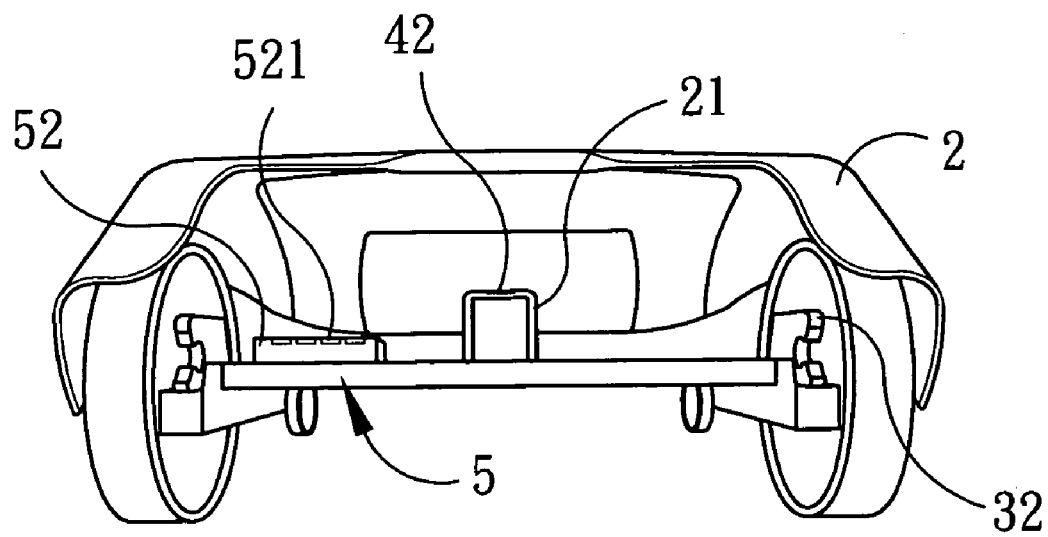
FIG. 5 is a view showing the detailed structure of the rear body of the electric scooter of the present invention.

Now, referencing to FIGS. 4 and 5, a locking device 4 is provided between the front body 1 and the rear body 2. The locking device 4 serves to further fix the front body 1 and the rear body 2 in place after the fastening means 3 has completed the assembly. The locking device 4 comprises a locking pin 41 and a locking notch 42. The locking pin 41 is pivotally provided on the accommodating rod 11 of the front body 1. The locking notch 42 is provided on the positioning pillar 21 of the rear body 2. A grip portion 411 is provided at the top portion of the locking pin 41 and extends out of the front body 1. A spring 412 is provided on the locking pin 41 and presses against the front body 1.

Now, please refer to FIGS. 6 and 7. When the front body 1 and the rear body 2 are assembled by the fastening means 3, the locking pin 41 is pushed upwards by the positioning pillar 21 and is moved by the spring 412 so as to be inserted into the locking notch 42. When the front body 1 and the rear body 2 are to be disassembled, we may lift grip portion 411 so that the locking pin 41 may be pulled out from the locking notch 42. Now, the front body 1 is substantially perpendicular to the rear body 2 so that the connecting pillar 31 may be disconnected from the positioning hook 32. Whence, the front body 1 may be easily detached from the rear body 2.

Referring to FIGS. 4 and 5, to simplify the electrical connection design, an electric connection device 5 is provided on the scooter body. The electric connection device 5 comprises a front connector 51 and a rear connector 52; the former is disposed on the front body 1, and the latter is disposed on the rear body 2. A conduction plate 511 and 521 is provided on the front connector 51 and rear connector 52 so that the front connector 51 may be electrically connected with the rear connector 52 through the two plates 511 and 521 after the front body is connected with the rear body.

According to the present invention, since the rapid assembly structure for the scooter body of an electric scooter improves and modifies on some current devices of the scooter body, the present invention just increases little cost. Further, the present invention is simple in structure, easy to set, and having high performance. Therefore, the present invention indeed provides a stable and rapid-assembly structure for a scooter body such that electric scooter can be easily carried and stored up.

Many changes and modifications in the abovementioned embodiment of the present invention can, of course, be carried out without departing from the scope thereof. Accordingly, to promote the progress in science and useful arts, the present invention is disclosed and is intended to be limited only by the scope of the appended claims.

What is claimed is:

1. A rapid assembly structure for a scooter body of an electric scooter, comprising:
    a front body having an accommodating rod for accommodating a seat;
    a rear body having a positioning pillar corresponding to the accommodating rod;
    a fastening means, provided between the front body and the rear body for fixing the front body and the rear body, including:
        a connecting pillar, provided on the front body corresponding to the position of the accommodating rod;
        a locking device, provided between the accommodating rod and the positioning pillar for enhancing a fixing effect between the front body and the rear body; and
        a positioning hook, provided on the rear body,
        wherein the connecting pillar has an oval shape, an opening of the positioning hook is smaller than the wider dimension of the oval shape, and the front body and the rear body are firmly assembled by hooking the positioning hook on the positioning pillar from a predetermined position; and
    an electric connection device, provided on the front body and rear body so that the front body may be electrically connected with the rear body when the former is connected with the latter.

2. The rapid assembly structure for the scooter body of an electric scooter according to claim 1, wherein the electric connection device comprises a front connector and a rear connector, the front connector being disposed on the front body, and the rear connector being disposed on the rear body, a conduction plate being provided on the front connector and rear connector so that the front connector is electrically connected with the rear connector through the two plates after the front body is connected with the rear body.

3. A rapid assembly structure for a scooter body of an electric scooter, comprising:
    a front body having an accommodating rod for accommodating a seat;
    a rear body having a positioning pillar corresponding to the accommodating rod;
    a fastening means, provided between the front body and the rear body for fixing the front body and the rear body, including:
        a connecting pillar, provided on the front body corresponding to the position of the accommodating rod; and
        a locking device, provided between the accommodating rod and the positioning pillar for enhancing a fixing effect between the front body and the rear body,
        wherein the locking device comprises a locking pin and a locking notch, the locking pin being pivotally provided on the accommodating rod of the front body, a grip portion being provided at the top portion of the locking pin and extending out of the front body, a spring being provided on the locking pin and pressing against the front body, the locking notch being provided on the positioning pillar of the rear body, and wherein when the front body and the rear body are assembled by the fastening means, the locking pin is pushed upwards by the positioning pillar and is moved by the spring so as to be inserted into the locking notch and so that the front body may be securely connected with the rear body.

4. The rapid assembly structure for the scooter body of an electric scooter according to claim 3, wherein the fastening means is provided with a positioning hook on the rear body, the connecting pillar has an oval shape, an opening of the positioning hook is smaller than the wider dimension of the oval shape, and the front body and the rear body are firmly assembled by hooking the positioning hook on the positioning pin from a predetermined position.

5. The rapid assembly structure for the scooter body of an electric scooter according to claim 3, wherein the electric connection device comprises a front connector and a rear connector, the front connector being disposed on the front body, and the rear connector being disposed on the rear body, a conduction plate being provided on the front connector and rear connector so that the front connector is electrically connected with the rear connector through the two plates after the front body is connected with the rear body.

* * * * *